United States Patent
Wei et al.

(10) Patent No.: US 9,693,269 B2
(45) Date of Patent: Jun. 27, 2017

(54) SOURCE BASE STATION AND MOBILE APPARATUS FOR USE IN LONG TERM EVOLUTION COMMUNICATION SYSTEM

(71) Applicant: Institute For Information Industry, Taipei (TW)

(72) Inventors: Chia-Hung Wei, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/343,170

(22) Filed: Nov. 3, 2016

(65) Prior Publication Data
US 2017/0134997 A1    May 11, 2017

Related U.S. Application Data

(60) Provisional application No. 62/251,690, filed on Nov. 6, 2015.

(51) Int. Cl.
*H04W 36/00* (2009.01)

(52) U.S. Cl.
CPC ... *H04W 36/0055* (2013.01); *H04W 36/0094* (2013.01)

(58) Field of Classification Search
CPC ............. H04W 36/0055; H04W 36/0094
See application file for complete search history.

(56) References Cited

U.S. PATENT DOCUMENTS

| | | | | |
|---|---|---|---|---|
| 2012/0176924 A1* | 7/2012 | Wu | ............. | H04W 72/0406 370/252 |
| 2014/0314041 A1* | 10/2014 | Kim | ............. | H04L 5/0048 370/329 |
| 2014/0329504 A1* | 11/2014 | Gupta | ............. | H04Q 3/0045 455/411 |
| 2016/0248562 A1* | 8/2016 | Nam | ............. | H04L 27/2601 |

* cited by examiner

*Primary Examiner* — Marcos Torres
(74) *Attorney, Agent, or Firm* — Skaar Ulbrich Macari, P.A.

(57) ABSTRACT

An LTE communication system is provided. The LTE communication system includes a mobile apparatus and a source BS. The source BS receives a target BS CSI configuration from a target BS and transmits an RRC configuration to the mobile apparatus. The RRC configuration includes a target BS temporary CSI configuration and a source BS temporary CSI configuration. The mobile apparatus continuously receives data from the source BS according to the source BS temporary CSI configuration, and synchronizes with the target BS while receiving data. The source BS stops transmitting data to the mobile apparatus based on a request from the mobile apparatus or signal quality of the mobile apparatus, and forwards un-transmitted data to the target BS. The mobile apparatus handovers to the target BS after finishing the synchronization with the target BS, and continues to receive the un-transmitted data from the target BS.

6 Claims, 7 Drawing Sheets

SOURCE BASE STATION AND MOBILE APPARATUS FOR USE IN LONG TERM EVOLUTION COMMUNICATION SYSTEM

PRIORITY

This application claims priority to U.S. Provisional Patent Application No. 62/251,690, filed on Nov. 6, 2015, which is hereby incorporated by reference in its entirety herein.

FIELD

The present invention relates to a Long Term Evolution (LTE) communication system and a handover method thereof. More particularly, the LTE communication system and the handover method thereof according to the present invention continuously perform data transmission during the handover process.

BACKGROUND

In conventional LTE communication systems, when a mobile apparatus intends to move from the communication coverage of a first base station to the communication coverage of a second base station, a handover procedure will be performed between the mobile apparatus and the base stations to ensure that the un-transmitted data of the first base station can be transmitted correctly via the second base station.

However, in the handover procedure of the conventional LTE communication system, when the first base station notifies the second base station and the mobile apparatus to start the handover procedure, the data transmission between the first base station and the mobile apparatus will stop accordingly, and the data transmission is continued only after the synchronization between the mobile apparatus and the second base station has been completed.

However, the synchronization between the mobile apparatus and the second base station usually requires a relatively long time, so the efficiency of the data transmission will be largely reduced and network resources will be wasted if the data transmission between the first base station and the mobile apparatus is stopped directly at the start of the synchronization.

Accordingly, an urgent need exists in the art to improve the drawbacks in the conventional LTE communication system that the handover efficiency is low and the network resources are wasted.

SUMMARY

The disclosure includes a handover method for a Long Term Evolution (LTE) communication system. The LTE communication system comprises a mobile apparatus and a source base station. The source base station notifies a target base station that the mobile apparatus will handover from the source base station to the target base station according to a measurement report message of the mobile apparatus. The handover method comprises the following steps of: (a) enabling the source base station to receive a target base station temporary Channel State Information (CSI) configuration from the target base station; (b) enabling the source base station to transmit a Radio Resource Control (RRC) configuration to the mobile apparatus, wherein the RRC configuration comprises the target base station temporary CSI configuration and a source base station temporary CSI configuration; (c) enabling the mobile apparatus to continuously receive data from the source base station according to the source base station temporary CSI configuration, and synchronize with the target base station while continuously receiving the data from the source base station; (d) enabling the mobile apparatus to transmit an end-communication CSI to the source base station according to the source base station temporary CSI configuration after it is determined that the synchronization with the target base station has been completed; (e) enabling the source base station to stop transmitting data to the mobile apparatus in response to the end-communication CSI and forward un-transmitted data to the target base station; and (f) enabling the mobile apparatus to handover to the target base station after the step (e) and continue to receive the un-transmitted data from the target base station according to the target base station temporary CSI configuration.

The disclosure also includes an LTE communication system, which comprises a mobile apparatus and a source base station. The source base station notifies the mobile apparatus to handover from the source base station to the target base station according to a measurement report message of the mobile apparatus. The source base station is further configured to: receive a target base station temporary Channel State Information (CSI) configuration from the target base station; and transmit a Radio Resource Control (RRC) configuration to the mobile apparatus. The RRC configuration comprises the target base station temporary CSI configuration and a source base station temporary CSI configuration. The mobile apparatus is configured to: continuously receive data from the source base station according to the source base station temporary CSI configuration, and synchronize with the target base station while continuously receiving the data from the source base station; and transmit an end-communication CSI to the source base station according to the source base station temporary CSI configuration after it is determined that the synchronization with the target base station has been completed. The source base station further stops transmitting data to the mobile apparatus in response to the end-communication CSI and forwards un-transmitted data to the target base station. The mobile apparatus further handovers to the target base station and continues to receive the un-transmitted data from the target base station according to the target base station temporary CSI configuration.

The disclosure further includes a handover method for a Long Term Evolution (LTE) communication system. The LTE communication system comprises a mobile apparatus and a source base station. The source base station notifies a target base station that the mobile apparatus will handover from the source base station to the target base station according to a measurement report message of the mobile apparatus. The handover method comprises the following steps of: (a) enabling the source base station to receive a target base station temporary Channel State Information (CSI) configuration from the target base station; (b) enabling the source base station to transmit a Radio Resource Control (RRC) configuration to the mobile apparatus, wherein the RRC configuration comprises the target base station temporary CSI configuration and a source base station temporary CSI configuration; (c) enabling the mobile apparatus to periodically report a temporary CSI to the source base station according to the source base station temporary CSI configuration and continuously receive data from the source base station, wherein the mobile apparatus synchronizes with the target base station while continuously receiving the data from the source base station; (d) enabling the source base station to stop transmitting data to the mobile apparatus and forward un-transmitted data to the target base station when it is determined that a value of the temporary CSI is smaller than a threshold value; and (e) enabling the mobile apparatus to handover to the target base station after the step (d) and continue to receive the un-transmitted data from the target base station according to the target base station temporary CSI configuration.

The disclosure additionally includes an LTE communication system, which comprises a mobile apparatus and a source base station. The source base station notifies a target base station that the mobile apparatus will handover from the source base station to the target base station according to a measurement report message of the mobile apparatus. The source base station is further configured to: receive a target base station temporary Channel State Information (CSI) configuration from the target base station; and transmit a Radio Resource Control (RRC) configuration to the mobile apparatus. The RRC configuration comprises the target base station temporary CSI configuration and a source base station temporary CSI configuration. The mobile apparatus is further configured to: periodically report a temporary CSI to the source base station according to the source base station temporary CSI configuration, and continuously receive data from the source base station. The mobile apparatus synchronizes with the target base station while continuously receiving the data from the source base station. The source base station further stops transmitting data to the mobile apparatus when it is determined that a value of the temporary CSI is smaller than a threshold value, and forwards un-transmitted data to the target base station. The mobile apparatus further handovers to the target base station and continues to receive the un-transmitted data from the target base station according to the target base station temporary CSI configuration.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. It shall be appreciated that, these example embodiments are not intended to limit the present invention to any particular example, embodiment, environment, applications or implementations described in these example embodiments. Therefore, description of these example embodiments is only for purpose of illustration rather than to limit the present invention, and the scope claimed in this application shall be governed by the claims.

In the following example embodiments and the attached drawings, elements unrelated to the present invention are omitted from depiction; and dimensional relationships among individual elements in the attached drawings are illustrated only for ease of understanding, but not to limit the actual scale.

Figure 1A:
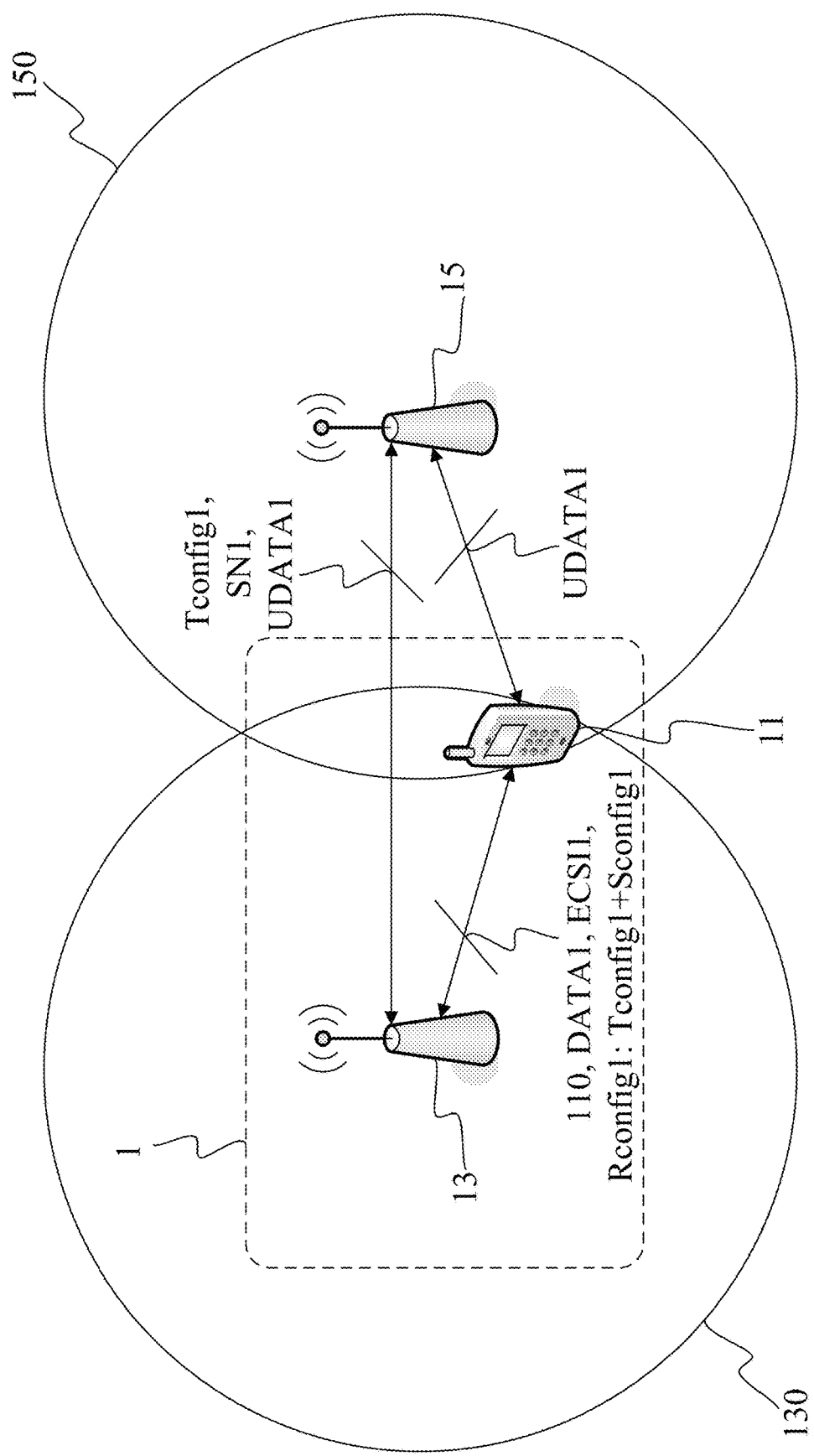
FIG. 1A is a schematic view of an LTE communication system according to a first embodiment of the present invention.
Figure 1B:
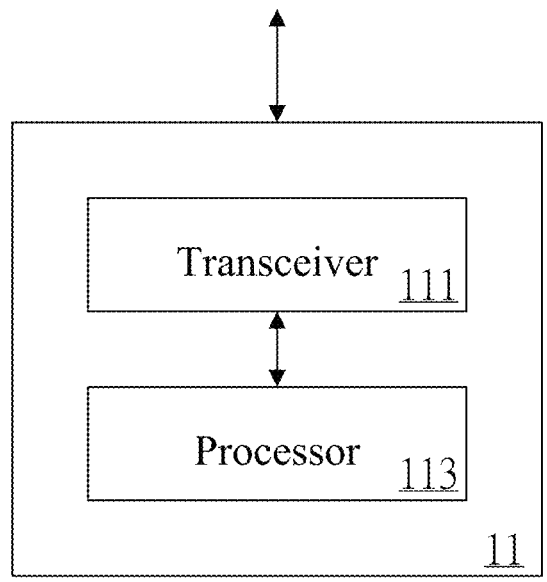
FIG. 1B is a block diagram of a mobile apparatus according to the first embodiment of the present invention.
Figure 1C:
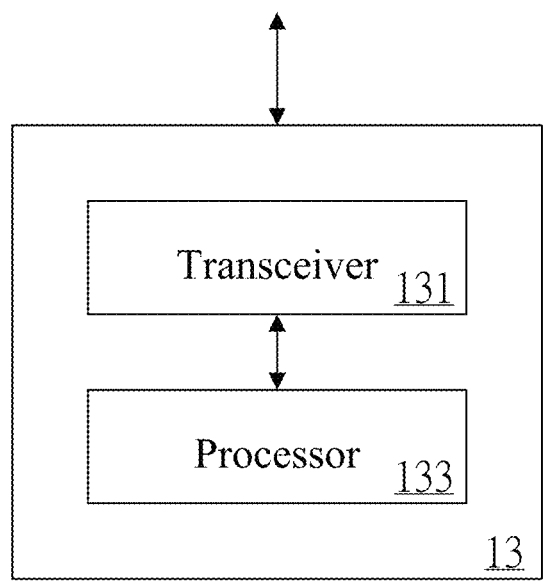
FIG. 1C is a block diagram of a source base station according to the first embodiment of the present invention.

Please refer to FIG. 1A to FIG. 1C. FIG. 1A is a schematic view of an LTE communication system 1 according to a first embodiment of the present invention. The LTE communication system 1 comprises a mobile apparatus 11 and a source base station 13. The source base station 13 is connected to a target base station 15.

FIG. 1B is a block diagram of a mobile apparatus 11 according to the first embodiment of the present invention. The mobile apparatus 11 comprises a transceiver 111 and a processor 113. FIG. 1C is a block diagram of a source base station 13 according to the first embodiment of the present invention. The source base station 13 comprises a transceiver 131 and a processor 133. Interactions between the elements will be further described hereinafter.

First, the mobile apparatus 11 is located within a communication coverage 130 of the source base station 13, and a handover procedure of the present invention is started among the mobile apparatus 11, the source base station 13 and the target base station 15 when the mobile apparatus 11 intends to move from the communication coverage 130 of the source base station 13 to a communication coverage 150 of the target base station 15 and leave the communication coverage 130 of the source base station 13.

Specifically, the processor 113 of the mobile apparatus 11 transmits a measurement report message 110 via the transceiver 111 to notify the source base station 13 of a signal transceiving state. When the signal transceiving state is getting worse, the processor 133 of the source base station 13 selects the target base station 15 to which the mobile apparatus 11 can be connected according to the measurement report message 110, and notifies the target base station 15 via the transceiver 131 that the mobile apparatus 11 intends to handover from the source base station 13 to the target base station 15.

Next, the processor 133 of the source base station 13 first receives a target base station temporary Channel State Information (CSI) configuration Tconfig1 from the target base station 15 via the transceiver 131, and then transmits a Radio Resource Control (RRC) configuration Rconfig1 to the mobile apparatus 11. In other words, the processor 113 of the mobile apparatus 11 receives the RRC configuration Rconfig1 from the source base station 13 via the transceiver 111. The RRC configuration Rconfig1 comprises the target base station temporary CSI configuration Tconfig1 and a source base station temporary CSI configuration Sconfig1.

It shall be particularly appreciated that, the RRC configuration Rconfig1 is a configuration profile used in the LTE system, and the function thereof will not be further described herein. In the present invention, the RRC configuration Rconfig1 is further mainly configured to transmit the target base station temporary CSI configuration Tconfig1 and the source base station temporary CSI configuration Sconfig1 to the mobile apparatus 11. In more detail, the target base station temporary CSI configuration Tconfig1 is mainly configured to notify the mobile apparatus 11 of the time and frequency resources required later for transmission of CSI report with the target base station 15. Similarly, the source base station temporary CSI configuration Sconfig1 is mainly configured to notify the mobile apparatus 11 of the time and frequency resources required later for transmission of CSI report with the source base station 13. Additionally, the temporary CSI configuration used in the present invention is characterized by a short report period as compared to the general CSI configuration, and thus can be used to reflect various channel states in real time.

Thereafter, the processor 113 of the mobile apparatus 11 can continuously receive data DATA1 from the source base station 13 via the transceiver 111 according to the source base station temporary CSI configuration Sconfig1, and periodically report the CSI according to the source base station temporary CSI configuration Sconfig1. Meanwhile, the processor 113 of the mobile apparatus 11 synchronizes with the target base station 15 via the transceiver 111 while continuously receiving the data DATA1.

It shall be particularly appreciated that, these skilled in the art shall appreciate the synchronization process between the mobile apparatus 11 and the target base station 15, e.g., the initiation of the synchronization, steps of uplink resource configuration and timing advance of the mobile apparatus and the completion of the RRC configuration or the like, and thus the synchronization process will not be further described herein. The present invention mainly emphasizes that the mobile apparatus 11 can continuously receive the data DATA1 from the source base station 13 while the mobile apparatus 11 synchronizes with the target base station 15.

Next, while the mobile apparatus 11 continuously receives the data DATA1 from the source base station 13, the processor 113 of the mobile apparatus 11 transmits an end-communication CSI ECSI1 to the source base station 13 via the transceiver 111 according to the source base station temporary CSI configuration Sconfig1 after it is determined that the synchronization with the target base station 15 has been completed, thereby notifying the source base station 13 to stop transmitting the data DATA1. The end-communication CSI ECSI1 may be a normal CSI report message of which the message parameter is set out-of-range (OOR) specially by the mobile apparatus 11 so that the source base station 13 considers that it cannot continue to communicate with the mobile apparatus 11 any more.

On the other hand, the processor 133 of the source base station 13 stops transmitting the data DATA1 to the mobile apparatus 11 after receiving the end-communication CSI ECSI1 via the transceiver 131 and forwards un-transmitted data UDATA1 to the target base station 15. Accordingly, the processor 113 of the mobile apparatus 11 can handover to the target base station 15 via the transceiver 111, and continue to receive the data un-transmitted by the source base station 13, i.e., the un-transmitted data UDATA1, from the target base station 15 according to the target base station temporary CSI configuration Tconfig1.

Through the aforesaid handover process of the present invention, the mobile apparatus 11 can periodically report the CSI continuously according to the source base station temporary CSI configuration Sconfig1, continuously receive the data DATA1 from the source base station 13 while the mobile apparatus 11 synchronizes with the target base station 15, and directly handover to the target base station 15 after the synchronization has been completed so as to receive the un-transmitted data UDATA1 according to the target base station temporary CSI configuration Tconfig1. In this way, the data transmission can be accomplished more efficiently and the utilization ratio of the network resources can be improved during the handover process.

It shall be additionally noted that, the step of forwarding the un-transmitted data UDATA1 to the target base station 15 by the source base station 13 in the first embodiment may be further divided into the following step of: first transmitting a data sequence number transmission state message SN1 to the target base station 15 by the processor 133 of the source base station 13 via the transceiver 131. The data sequence number transmission state message SN1 is used to notify the target base station 15 of the transmission states of data having different sequence numbers in the data DATA1.

In this way, the processor 133 of the source base station 13 can further forward the un-transmitted data UDATA1 to the target base station 15 via the transceiver 131 according to the data sequence number transmission state message SN1 so that the target base station 15 subsequently transmits the un-transmitted data UDATA1 to the mobile apparatus 11. However, this is only an embodiment and it is not intended to limit the way in which the data is forwarded.

It shall be particularly appreciated that, the aforesaid processor may be a central processing unit and the relevant circuit thereof, the transceiver may be a relevant hardware unit capable of network connection (e.g., a wired network card for the connection between base stations, a wireless network card for the connection between a base station and a mobile apparatus, or a combination thereof), and the relevant functions of the aforesaid processor and transceiver shall be readily appreciated by those skilled in the art through the description of the present invention.

Figure 2:
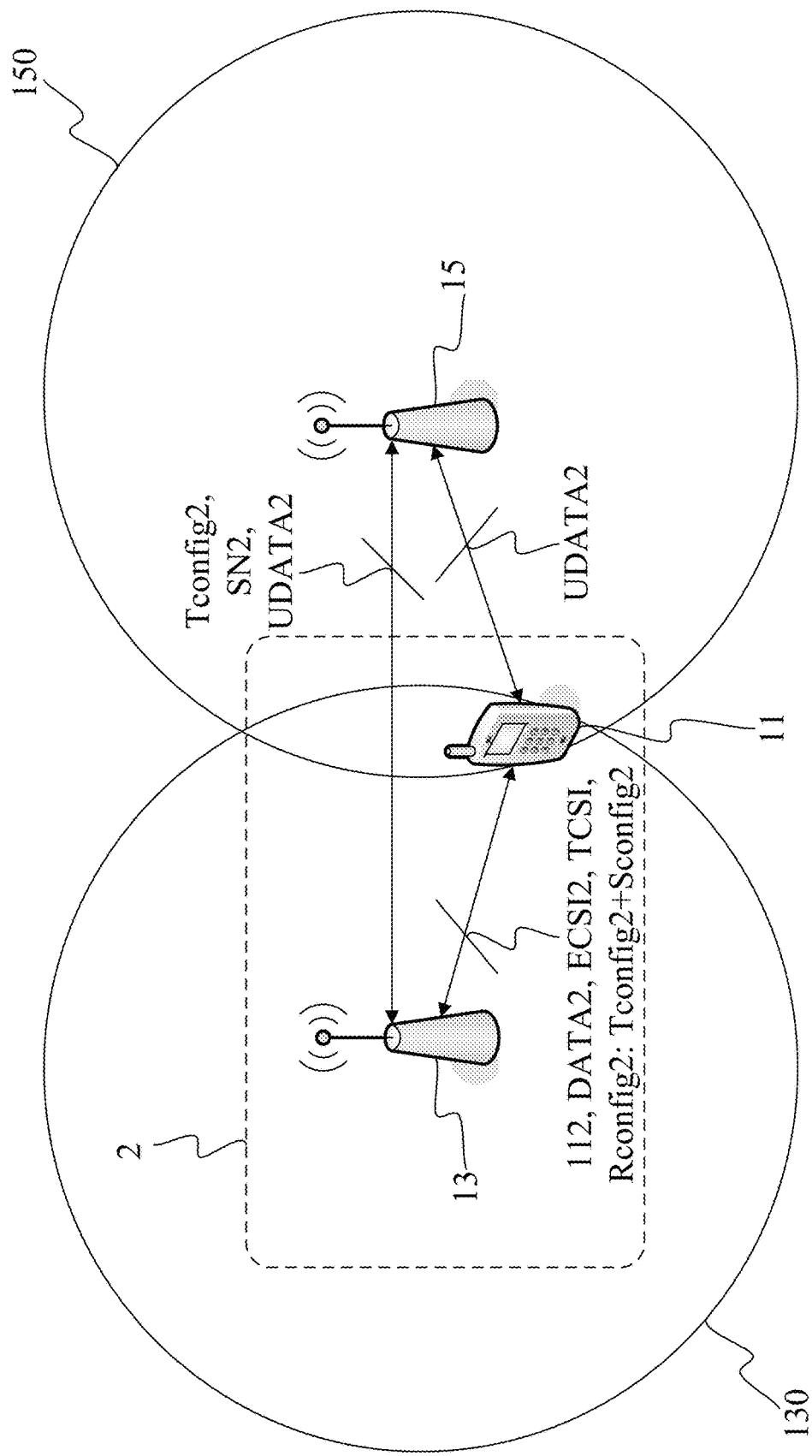
FIG. 2 is a schematic view of an LTE communication system according to a second embodiment of the present invention.

Referring to FIG. 2, FIG. 2 is a schematic view of an LTE communication system 2 according to a second embodiment of the present invention. The network architecture of the second embodiment is similar to that of the first embodiment, so elements labeled by the same reference symbols have the same functions and thus will not be further described herein. The second embodiment mainly further illustrates how the source base station 13 determines the time to stop transmitting the data and to forward the data.

Similarly, the mobile apparatus 11 is located within the communication coverage 130 of the source base station 13, and the handover procedure of the present invention is started among the mobile apparatus 11, the source base station 13 and the target base station 15 when the mobile apparatus 11 intends to move from the communication coverage 130 of the source base station 13 to the communication coverage 150 of the target base station 15 and leave the communication coverage 130 of the source base station 13.

Specifically, the processor 113 of the mobile apparatus 11 transmits a measurement report message 112 via the transceiver 111 to notify the source base station 13 of a signal transceiving state. When the signal transceiving state is getting worse, the processor 133 of the source base station 13 selects the target base station 15 to which the mobile apparatus 11 can be connected according to the measurement report message 112, and notifies the target base station 15 via the transceiver 131 that the mobile apparatus 11 intends to handover from the source base station 13 to the target base station 15.

Next, the processor 133 of the source base station 13 first receives a target base station temporary Channel State Information (CSI) configuration Tconfig2 from the target base station 15 via the transceiver 131, and then transmits a RRC configuration Rconfig2 to the mobile apparatus 11. In other words, the processor 113 of the mobile apparatus 11 receives the RRC configuration Rconfig2 from the source base station 13 via the transceiver 111. The RRC configuration Rconfig2 comprises the target base station temporary CSI configuration Tconfig2 and a source base station temporary CSI configuration Sconfig2.

Similarly, the RRC configuration Rconfig2 is a configuration profile used in the LTE system, and the function thereof will not be further described herein. In the present invention, the RRC configuration Rconfig2 is further mainly configured to transmit the target base station temporary CSI configuration Tconfig2 and the source base station temporary CSI configuration Sconfig2 to the mobile apparatus 11.

In more detail, the target base station temporary CSI configuration Tconfig2 is mainly configured to notify the mobile apparatus 11 of the time and frequency resources required later for transmission of CSI report with the target base station 15, while the source base station temporary CSI configuration Sconfig2 is mainly configured to notify the mobile apparatus 11 of the time and frequency resources required later for transmission of CSI report with the source base station 13.

In the second embodiment, the processor 113 of the mobile apparatus 11 can periodically report a temporary CSI TCSI to the source base station 13 via the transceiver 111 according to the source base station temporary CSI configuration Sconfig2, and continuously receive data DATA2 from the source base station 13. Meanwhile, the processor 113 of the mobile apparatus 11 synchronizes with the target base station 15 via the transceiver 111 while continuously receiving the data DATA2.

It shall be again noted that, these skilled in the art shall appreciate the synchronization process between the mobile apparatus 11 and the target base station 15, e.g., the initiation of the synchronization, steps of uplink resource configuration and timing advance of the mobile apparatus and the completion of the RRC configuration or the like, and thus the synchronization process will not be further described herein. The present invention mainly emphasizes that the mobile apparatus 11 can continuously receive the data DATA2 from the source base station 13 according to the source base station temporary CSI configuration Sconfig2 while the mobile apparatus 11 synchronizes with the target base station 15.

On the other hand, since the mobile apparatus 11 periodically reports the channel and signal states to the source base station 13 by using the temporary CSI TCSI, the source base station 13 can accordingly determine whether it needs to continuously transmit the data DATA2 to the mobile apparatus 11 or directly forward the un-transmitted data UDATA2 to the target base station 15.

Further speaking, the processor 133 of the source base station 13 may determine whether a value of the temporary CSI TCSI (a value relevant to the channel quality that is comprised in the CSI, e.g., a value of a Channel Quality Indicator (CQI)) is smaller than a threshold value (not shown) every time the transceiver 131 receives the temporary CSI TCSI, and the threshold value is used as a standard for determining the channel and signal quality. In detail, if the value of the temporary CSI TCSI is not smaller than the threshold value, then it means that the current communication quality between the mobile apparatus 11 and the source base station 13 is still good enough for the transmission of the data DATA2, so the source base station 13 continuously transmits the data DATA2 to the mobile apparatus 11.

On the other hand, when the value of the temporary CSI TCSI is smaller than the threshold value, then it means that the current communication quality between the mobile apparatus 11 and the source base station 13 is not good enough for the transmission of the data DATA2. Accordingly, the processor 133 of the source base station 13 stops transmitting the data DATA2 to the mobile apparatus 11 via the transceiver 131 when the processor 133 of the source base station 13 determines that the value of the temporary CSI TCSI is smaller than the threshold value, and forwards the un-transmitted data UDATA2 to the target base station 15.

Accordingly, the processor 113 of the mobile apparatus 11 can handover to the target base station 15 via the transceiver 111 after the synchronization with the target base station 15 is completed, and continue to receive the data un-transmitted by the source base station 13, i.e., the un-transmitted data UDATA2, from the target base station 15 according to the target base station temporary CSI configuration Tconfig2.

Similarly, the step of forwarding the un-transmitted data UDATA2 to the target base station 15 by the source base station 13 in the second embodiment may be further divided into the following step of: first transmitting a data sequence number transmission state message SN2 to the target base station 15 by the processor 133 of the source base station 13 via the transceiver 131. The data sequence number transmission state message SN2 is used to notify the target base station 15 of the transmission states of data having different sequence numbers in the data DATA2.

In this way, the processor 133 of the source base station 13 can further forward the un-transmitted data UDATA2 to the target base station 15 via the transceiver 131 according to the data sequence number transmission state message SN2 so that the target base station 15 subsequently transmits the un-transmitted data UDATA2 to the mobile apparatus 11. However, this is only an embodiment and it is not intended to limit the way in which the data is forwarded.

Figure 3:
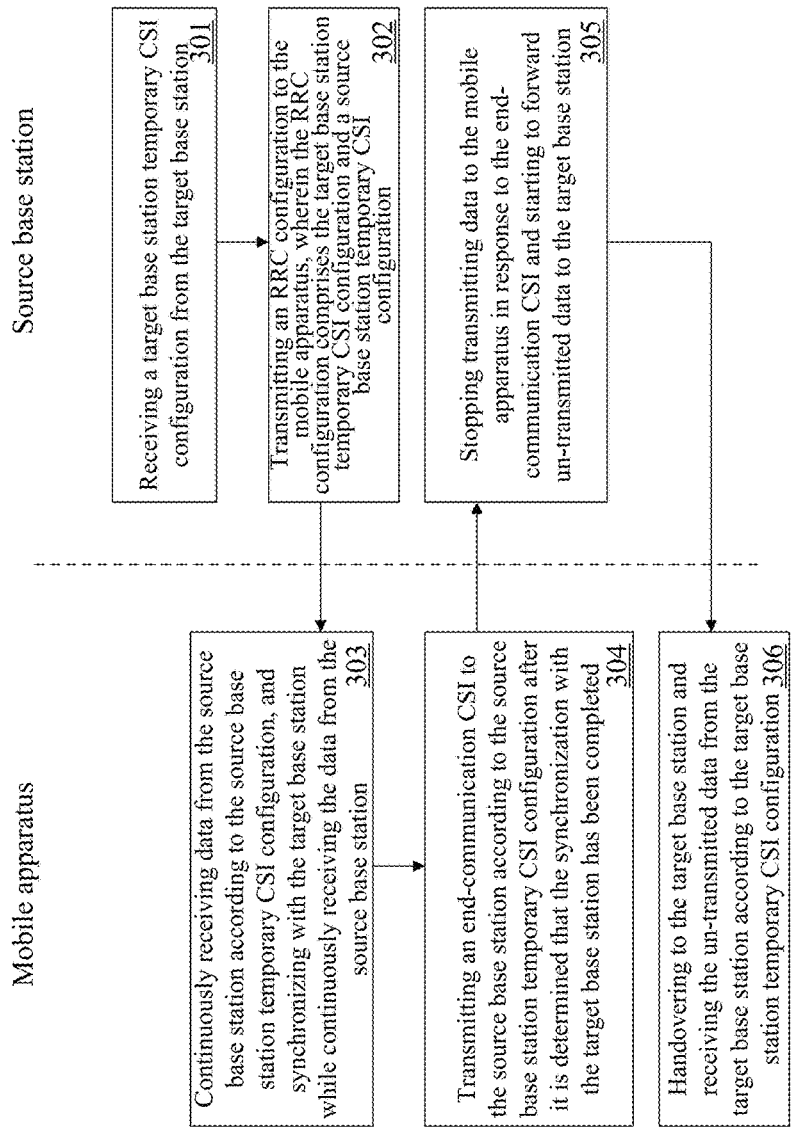
FIG. 3 is a flowchart diagram of a handover method according to a third embodiment of the present invention.

A third embodiment of the present invention is a handover method, and a flowchart diagram thereof is shown in FIG. 3. The method of the third embodiment is used in an LTE communication system (e.g., the LTE communication system 1 of the aforesaid embodiment). The LTE communication system comprises a mobile apparatus and a source base station. The source base station notifies a target base station that the mobile apparatus handovers from the source base station to the target base station according to a measurement report message of the mobile apparatus. Detailed steps of the third embodiment are as follows.

First, step 301 is executed to enable the source base station to receive a target base station temporary Channel State Information (CSI) configuration from the target base station. Step 302 is executed to enable the source base station to transmit a RRC configuration to the mobile apparatus. The RRC configuration comprises the target base station temporary CSI configuration and a source base station temporary CSI configuration.

It shall be particularly appreciated that, the RRC configuration in the present invention is mainly configured to transmit the target base station temporary CSI configuration and the source base station temporary CSI configuration to the mobile apparatus. The target base station temporary CSI configuration is mainly configured to notify the mobile apparatus of the time and frequency resources required later for transmission of CSI report with the target base station. The source base station temporary CSI configuration is mainly configured to notify the mobile apparatus of the time and frequency resources required later for transmission of CSI report with the source base station.

Next, step 303 is executed to enable the mobile apparatus to continuously receive data from the source base station according to the source base station temporary CSI configuration, and synchronize with the target base station while continuously receiving the data from the source base station. Step 304 is executed to enable the mobile apparatus to transmit an end-communication CSI to the source base station according to the source base station temporary CSI configuration after it is determined that the synchronization with the target base station has been completed.

Thereafter, step 305 is executed to enable the source base station to stop transmitting data to the mobile apparatus in response to the end-communication CSI and forward un-transmitted data to the target base station. Finally, step 306 is executed to enable the mobile apparatus to handover to the target base station after the step 305 and receive the un-transmitted data from the target base station according to the target base station temporary CSI configuration.

Figure 4:
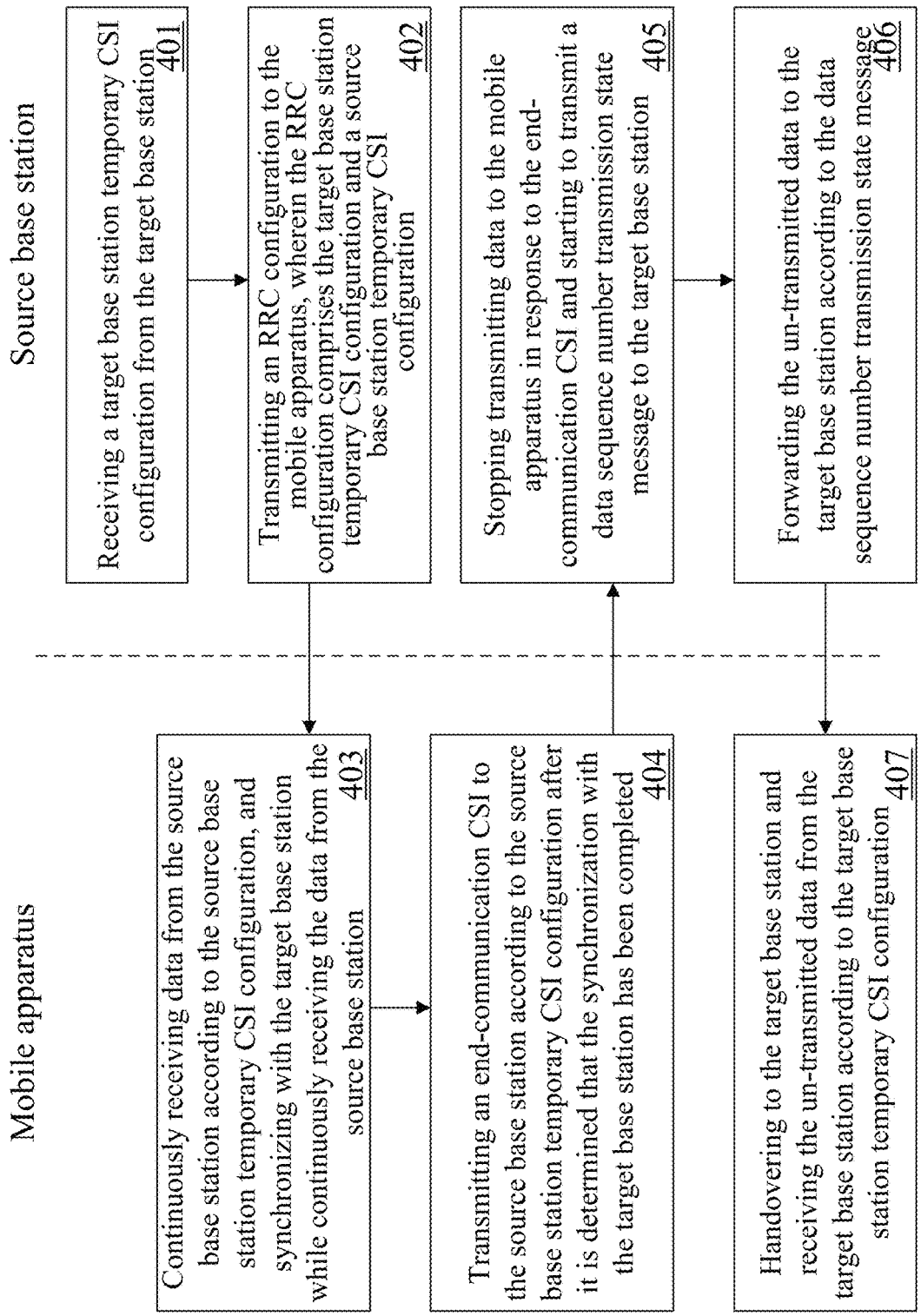
FIG. 4 is a flowchart diagram of a handover method according to a fourth embodiment of the present invention.

A fourth embodiment of the present invention is a handover method, and a flowchart diagram thereof is shown in FIG. 4. The method of the fourth embodiment is used in an LTE communication system (e.g., the LTE communication system 1 of the aforesaid embodiment). The LTE communication system comprises a mobile apparatus and a source base station. The source base station notifies a target base station that the mobile apparatus handovers from the source base station to the target base station according to a measurement report message of the mobile apparatus. Detailed steps of the fourth embodiment are as follows.

First, step 401 is executed to enable the source base station to receive a target base station temporary CSI configuration from the target base station. Step 402 is executed to enable the source base station to transmit an RRC configuration to the mobile apparatus. The RRC configuration comprises the target base station temporary CSI configuration and a source base station temporary CSI configuration.

It shall be particularly appreciated that, the RRC configuration in the present invention is mainly configured to transmit the target base station temporary CSI configuration and the source base station temporary CSI configuration to the mobile apparatus. The target base station temporary CSI configuration is mainly configured to notify the mobile apparatus of the time and frequency resources required later for transmission of CSI report with the target base station. The source base station temporary CSI configuration is mainly configured to notify the mobile apparatus of the time and frequency resources required later for transmission of CSI report with the source base station.

Next, step 403 is executed to enable the mobile apparatus to continuously receive data from the source base station according to the source base station temporary CSI configuration, and synchronize with the target base station while continuously receiving the data from the source base station. Step 404 is executed to enable the mobile apparatus to transmit an end-communication CSI to the source base station according to the source base station temporary CSI configuration after it is determined that the synchronization with the target base station has been completed.

Thereafter, step 405 is executed to enable the source base station to stop transmitting data to the mobile apparatus in response to the end-communication CSI and transmit a data sequence number transmission state message to the target base station. Step 406 is executed to enable the source base station to forward the un-transmitted data to the target base station according to the data sequence number transmission state message. Finally, step 407 is executed to enable the mobile apparatus to handover to the target base station after the step 406 and receive the un-transmitted data from the target base station according to the target base station temporary CSI configuration.

Figure 5:
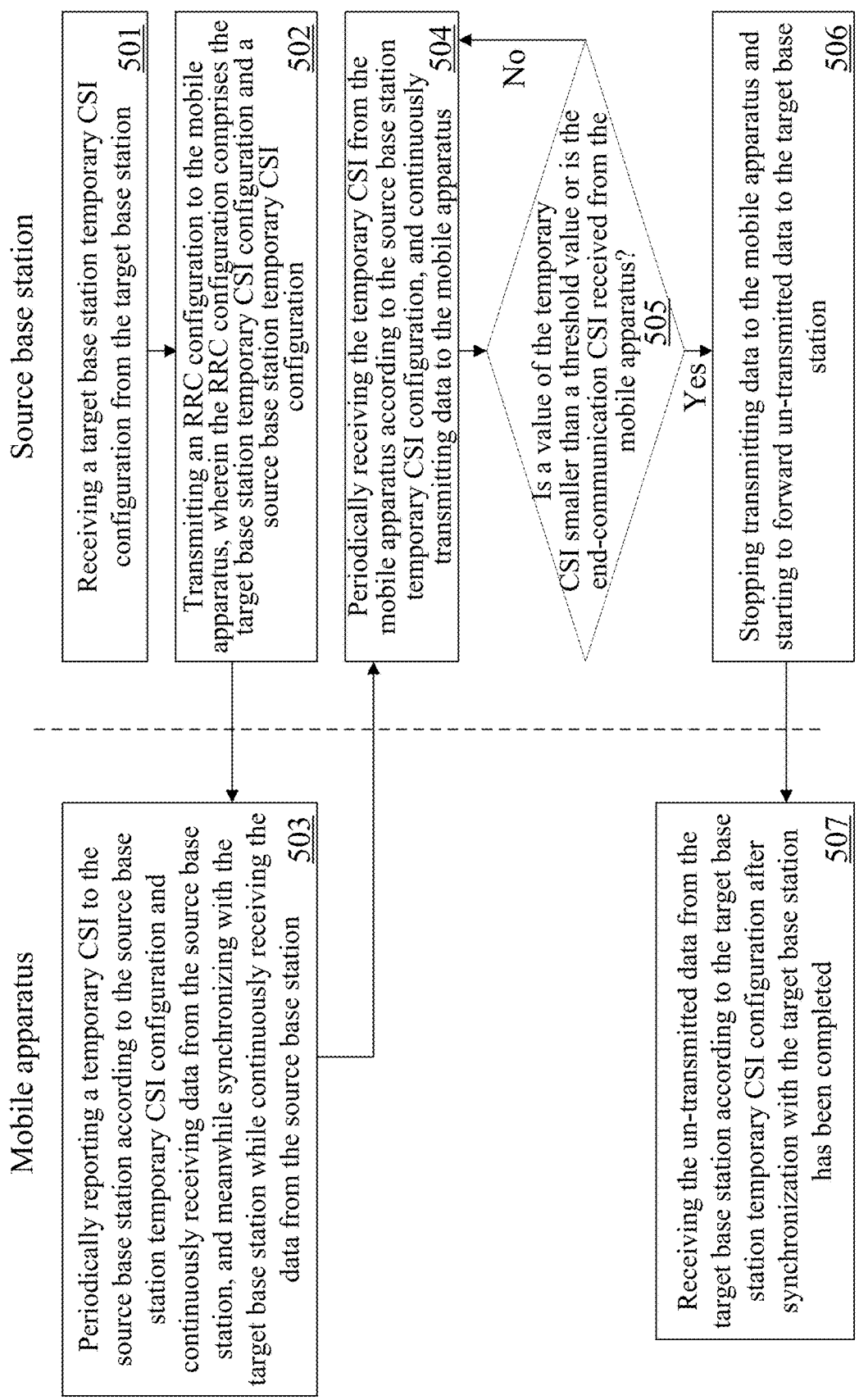
FIG. 5 is a flowchart diagram of a handover method according to a fifth embodiment of the present invention.

A fifth embodiment of the present invention is a handover method, and a flowchart diagram thereof is shown in FIG. 5. The method of the fifth embodiment is used in an LTE communication system (e.g., the LTE communication system 2 of the aforesaid embodiment). The LTE communication system comprises a mobile apparatus and a source base station. The source base station notifies a target base station that the mobile apparatus handovers from the source base station to the target base station according to a measurement report message of the mobile apparatus. Detailed steps of the fifth embodiment are as follows.

First, step 501 is executed to enable the source base station to receive a target base station temporary CSI configuration from the target base station. Step 502 is executed to enable the source base station to transmit an RRC configuration to the mobile apparatus. The RRC configuration comprises the target base station temporary CSI configuration and a source base station temporary CSI configuration.

It shall be particularly appreciated that, the RRC configuration in the present invention is mainly configured to transmit the target base station temporary CSI configuration and the source base station temporary CSI configuration to the mobile apparatus. The target base station temporary CSI configuration is mainly configured to notify the mobile apparatus of the time and frequency resources required later for transmission of CSI report with the target base station. The source base station temporary CSI configuration is mainly configured to notify the mobile apparatus of the time and frequency resources required later for transmission of CSI report with the source base station.

Next, step 503 is executed to enable the mobile apparatus to periodically report a temporary CSI to the source base station according to the source base station temporary CSI configuration and continuously receive data from the source base station. The mobile apparatus synchronizes with the target base station while continuously receiving the data from the source base station. Step 504 is executed to enable the source base station to periodically receive the temporary CSI from the mobile apparatus according to the source base station temporary CSI configuration, and continuously transmit data to the mobile apparatus.

Step 505 is executed to enable the source base station to determine whether a value of the temporary CSI is smaller than a threshold value or whether the end-communication CSI is received from the mobile apparatus. If both of the determination results are no, then the step 504 is repeated. If one of the determination results is yes, then step 506 is executed to enable the source base station to stop transmitting data to the mobile apparatus and forward un-transmitted data to the target base station. Finally, step 507 is executed to enable the mobile apparatus to receive the un-transmitted data from the target base station according to the target base station temporary CSI configuration after synchronization with the target base station has been completed.

Figure 6:
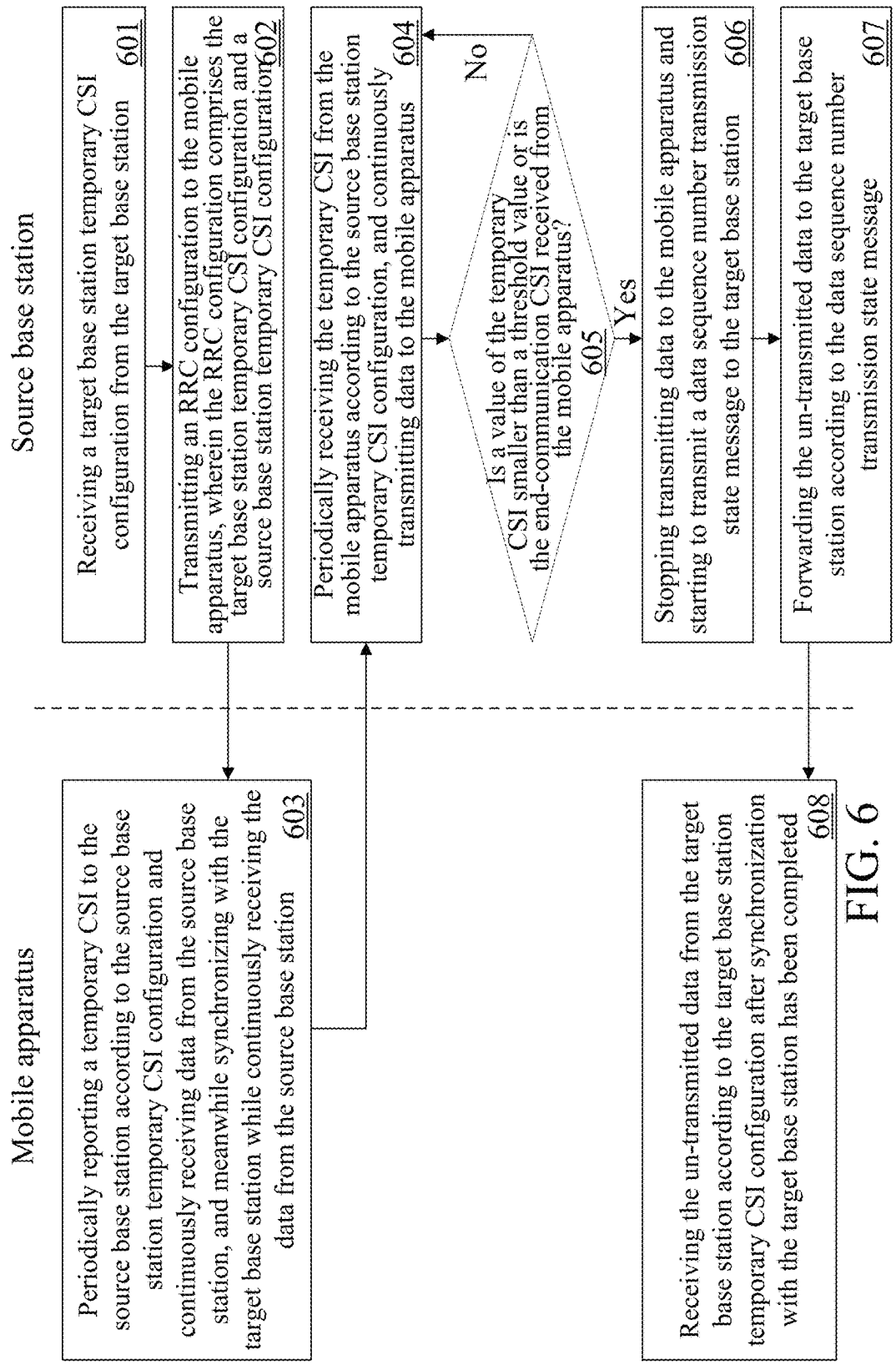
FIG. 6 is a flowchart diagram of a handover method according to a sixth embodiment of the present invention.

A sixth embodiment of the present invention is a handover method, and a flowchart diagram thereof is shown in FIG. 6. The method of the sixth embodiment is used in an LTE communication system (e.g., the LTE communication system 2 of the aforesaid embodiment). The LTE communication system comprises a mobile apparatus and a source base station. The source base station notifies a target base station that the mobile apparatus handovers from the source base station to the target base station according to a measurement report message of the mobile apparatus. Detailed steps of the sixth embodiment are as follows.

First, step 601 is executed to enable the source base station to receive a target base station temporary CSI configuration from the target base station. Step 602 is executed to enable the source base station to transmit an RRC configuration to the mobile apparatus. The RRC configuration comprises the target base station temporary CSI configuration and a source base station temporary CSI configuration.

It shall be particularly appreciated that, the RRC configuration in the present invention is mainly configured to transmit the target base station temporary CSI configuration and the source base station temporary CSI configuration to the mobile apparatus. The target base station temporary CSI configuration is mainly configured to notify the mobile apparatus of the time and frequency resources required later for transmission of CSI report with the target base station. The source base station temporary CSI configuration is mainly configured to notify the mobile apparatus of the time and frequency resources required later for transmission of CSI report with the source base station.

Next, step 603 is executed to enable the mobile apparatus to periodically report a temporary CSI to the source base station according to the source base station temporary CSI configuration and continuously receive data from the source base station. The mobile apparatus synchronizes with the target base station while continuously receiving the data from the source base station. Step 604 is executed to enable the source base station to periodically receive the temporary CSI from the mobile apparatus according to the source base station temporary CSI configuration, and continuously transmit data to the mobile apparatus.

Step 605 is executed to enable the source base station to determine whether a value of the temporary CSI is smaller than a threshold value or whether the end-communication CSI is received from the mobile apparatus. If both of the determination results are no, then the step 604 is repeated. If one of the determination results is yes, then step 606 is executed to enable the source base station to stop transmitting data to the mobile apparatus and transmit a data sequence number transmission state message to the target base station. Step 607 is executed to enable the source base station to forward the un-transmitted data to the target base station according to the data sequence number transmission state message. Finally, step 608 is executed to enable the mobile apparatus to receive the un-transmitted data from the target base station according to the target base station temporary CSI configuration after synchronization with the target base station has been completed.

According to the above descriptions, the LTE communication system and the handover method thereof according to the present invention are mainly capable of continuously transmitting data from the source base station to the mobile apparatus while the mobile apparatus synchronizes with the target base station, stopping the data transmission only if the synchronization between the mobile apparatus and the target base station has been completed or the communication quality between the mobile apparatus and the source base station is not good enough for the data transmission, and forwarding the un-transmitted data to the target base station for later transmission to the mobile apparatus. In this way, the data transmission can be accomplished more efficiently and the utilization ratio of the network resources can be improved during the handover process, thereby improving the drawbacks of the handover process under the conventional LTE architecture.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile apparatus for a Long Term Evolution (LTE) communication system, the LTE communication system further comprising a source base station, the source base station notifying a target base station that the mobile apparatus handovers from the source base station to the target base station according to a measurement report message of the mobile apparatus and receiving a target base station temporary Channel State Information (CSI) configuration from the target base station, the mobile apparatus comprising:
   a transceiver; and
   a processor;
   wherein the processor is configured to, via the transceiver,
      receive a Radio Resource Control (RRC) configuration from the source base station, wherein the RRC configuration comprises the target base station temporary CSI configuration and a source base station temporary CSI configuration;
      continuously receive data from the source base station according to the source base station temporary CSI configuration, and synchronizing with the target base station while continuously receiving the data from the source base station;
      transmit an end-communication CSI to the source base station according to the source base station temporary CSI configuration after it is determined that the synchronization with the target base station has been completed so that the source base station stops transmitting data to the mobile apparatus in response to the end-communication CSI and forwards un-transmitted data to the target base station; and
      handover to the target base station and receive the un-transmitted data from the target base station according to the target base station temporary CSI configuration.

2. A source base station for a Long Term Evolution (LTE) communication system, the LTE communication system further comprising a mobile apparatus, the source base station notifying a target base station that the mobile apparatus handovers from the source base station to the target base station according to a measurement report message of the mobile apparatus, the source base station comprising:
   a transceiver; and
   a processor;
   wherein the processor is configured to, via the transceiver,
      receive a target base station temporary Channel State Information (CSI) configuration from the target base station;
      transmit a Radio Resource Control (RRC) configuration to the mobile apparatus, wherein the RRC configuration comprises the target base station temporary CSI configuration and a source base station temporary CSI configuration;
      continuously transmit data to the mobile apparatus according to the source base station temporary CSI configuration, wherein the mobile apparatus synchronizes with the target base station while continuously receiving the data from the source base station;

receive an end-communication CSI from the mobile apparatus, wherein the end-communication CSI is transmitted by the mobile apparatus according to the source base station temporary CSI configuration after it is determined that the synchronization with the target base station has been completed; and stop transmitting data to the mobile apparatus in response to the end-communication CSI and forward un-transmitted data to the target base station so that the mobile apparatus receives the un-transmitted data from the target base station according to the target base station temporary CSI configuration after handovering to the target base station.

3. The source base station according to claim 2, wherein the processor is further configured to, via the transceiver, stop transmitting data to the mobile apparatus in response to the end-communication CSI, and transmit a data sequence number transmission state message to the target base station; and forward the un-transmitted data to the target base station according to the data sequence number transmission state message so that the mobile apparatus receives the un-transmitted data from the target base station after handovering to the target base station.

4. A mobile apparatus for a Long Term Evolution (LTE) communication system, the LTE communication system further comprising a source base station, the source base station notifying a target base station that the mobile apparatus handovers from the source base station to the target base station according to a measurement report message of the mobile apparatus and receiving a target base station temporary Channel State Information (CSI) configuration from the target base station, the mobile apparatus comprising:

a transceiver; and a processor;

wherein the processor is configured to, via the transceiver, receive a Radio Resource Control (RRC) configuration from the source base station, wherein the RRC configuration comprises the target base station temporary CSI configuration and a source base station temporary CSI configuration;

periodically report a temporary CSI to the source base station according to the source base station temporary CSI configuration and continuously receive data from the source base station so that, when it is determined that a value of the temporary CSI is smaller than a threshold value, the source base station stops transmitting data to the mobile apparatus and forwards un-transmitted data to the target base station, wherein the mobile apparatus synchronizes with the target base station while continuously receiving the data from the source base station; and receive the un-transmitted data from the target base station according to the target base station temporary CSI configuration after the synchronization with the target base station has been completed.

5. A source base station for a Long Term Evolution (LTE) communication system, the LTE communication system further comprising a mobile apparatus, the source base station notifying a target base station that the mobile apparatus handovers from the source base station to the target base station according to a measurement report message of the mobile apparatus, the source base station comprising:

a transceiver; and a processor;

wherein the processor is configured to, via the transceiver, receive a target base station temporary Channel State Information (CSI) configuration from the target base station;

transmit a Radio Resource Control (RRC) configuration to the mobile apparatus, wherein the RRC configuration comprises the target base station temporary CSI configuration and a source base station temporary CSI configuration;

periodically receive a temporary CSI from the mobile apparatus according to the source base station temporary CSI configuration, and continuously transmit data to the mobile apparatus, wherein the mobile apparatus synchronizes with the target base station while continuously receiving the data from the source base station; and stop transmitting data to the mobile apparatus when it is determined that a value of the temporary CSI is smaller than a threshold value, and forward un-transmitted data to the target base station so that the mobile apparatus receives the un-transmitted data from the target base station according to the target base station temporary CSI configuration after the synchronization with the target base station has been completed.

6. The source base station according to claim 5, wherein the processor is further configured to, via the transceiver, if it is determined that the value of the temporary CSI is smaller than the threshold value, then stop transmitting data to the mobile apparatus and transmit a data sequence number transmission state message to the target base station; and forward the un-transmitted data to the target base station according to the data sequence number transmission state message.

* * * * *